US012649662B2

(12) United States Patent
Wan et al.

(10) Patent No.: US 12,649,662 B2
(45) Date of Patent: Jun. 9, 2026

(54) LITHIUM IRON PHOSPHATE COMPOSITE MATERIAL, PREPARATION METHOD AND USE

(71) Applicant: SVOLT ENERGY TECHNOLOGY CO., LTD., Changzhou (CN)

(72) Inventors: Ning Wan, Changzhou (CN); Hongxin Yang, Changzhou (CN); Jing Liu, Changzhou (CN)

(73) Assignee: SVOLT ENERGY TECHNOLOGY CO., LTD., Changzhou (CN)

( * ) Notice: Subject to any disclaimer, the term of this patent is extended or adjusted under 35 U.S.C. 154(b) by 125 days.

(21) Appl. No.: 18/719,409

(22) Filed: Jun. 13, 2024

(65) Prior Publication Data

US 2025/0304446 A1     Oct. 2, 2025

Related U.S. Application Data

(63) Continuation of application No. PCT/CN2022/086015, filed on Apr. 11, 2022.

(30) Foreign Application Priority Data

Dec. 16, 2021     (CN) .......................... 202111547010.3

(51) Int. Cl.
*C01B 25/45* (2006.01)
*C01G 45/1214* (2025.01)

(52) U.S. Cl.
CPC .......... *C01B 25/45* (2013.01); *C01G 45/1214* (2013.01); *C01P 2004/03* (2013.01);
(Continued)

(58) Field of Classification Search
CPC . C01B 25/45; C01G 45/1214; C01P 2004/03; C01P 2004/04; C01P 2004/84;
(Continued)

(56) References Cited

U.S. PATENT DOCUMENTS

2012/0264018 A1*  10/2012  Kong .................... H01M 4/505
                                                                429/220
2016/0145104 A1*  5/2016  He ...................... H01M 4/5825
                                                                423/306

FOREIGN PATENT DOCUMENTS

CN          101580238 A      11/2009
CN          103682344 A  *   3/2014   .......... H01M 4/5825
                              (Continued)

OTHER PUBLICATIONS

Yasuda WO2015011883A1 English (Year: 2015).*
(Continued)

*Primary Examiner* — Sally A Merkling
*Assistant Examiner* — Jordan W Taylor
(74) *Attorney, Agent, or Firm* — Ming Jiang; OPENPTO US LLC

(57) ABSTRACT

The present application provides a lithium iron phosphate composite material, a preparation method and use. The lithium iron phosphate composite material includes a core and a shell coated on the core, in particular, the core is $Li_6MnO_4$, and the shell is carbon-coated lithium iron phosphate. The lithium iron phosphate composite material provided by the present application adopts $Li_6MnO_4$ as the positive electrode lithium supplement material, and solves problems of active lithium loss and capacity depletion under high-rate charge and discharge of lithium iron phosphate positive electrode, thereby improving the rate performance of the lithium iron phosphate materials and the cycle life of batteries at high rates.

16 Claims, 4 Drawing Sheets

(52) U.S. Cl.
CPC ...... *C01P 2004/04* (2013.01); *C01P 2004/84* (2013.01); *C01P 2006/40* (2013.01)

(58) Field of Classification Search
CPC ........... C01P 2006/40; H01M 10/0525; H01M 2004/021; H01M 2004/028; H01M 4/0471; H01M 4/36; H01M 4/366; H01M 4/505; H01M 4/5825; H01M 4/625; Y02E 60/10
See application file for complete search history.

(56) References Cited

FOREIGN PATENT DOCUMENTS

| CN | 107240696 | A |   | 10/2017 |   |
|----|-----------|---|---|---------|---|
| CN | 107968195 | A |   | 4/2018 |   |
| CN | 108598383 | A | * | 9/2018 | ........... H01M 4/366 |
| CN | 108682894 | A |   | 10/2018 |   |
| CN | 109301216 | A |   | 2/2019 |   |
| CN | 109346335 | A | * | 2/2019 | ........... H01M 4/505 |
| CN | 109390563 | A |   | 2/2019 |   |
| CN | 110299515 | A | * | 10/2019 | ........... H01M 4/625 |
| CN | 111146412 | A | * | 5/2020 | ........... H01M 4/483 |
| CN | 112054166 | A |   | 12/2020 |   |
| CN | 113097455 | A |   | 7/2021 |   |
| CN | 113555538 | A |   | 10/2021 |   |
| CN | 113772650 | A | * | 12/2021 | ......... H01M 4/5825 |
| CN | 114242980 | A |   | 3/2022 |   |
| CN | 115810725 | A |   | 3/2023 |   |
| JP | 2019-145402 | A |   | 8/2019 |   |
| WO | WO-2014206337 | A1 | * | 12/2014 | ........... C01B 25/45 |
| WO | WO-2015011883 | A1 | * | 1/2015 | ............. H01M 4/38 |

OTHER PUBLICATIONS

Jiao et al. (CN110299515A English) (Year: 2019).*
Yu et al. (CN111146412A English) (Year: 2020).*
Zhou et al. (CN113772650A English) (Year: 2021).*
Duan et al. (CN103682344A English) (Year: 2014).*
Chen et al. (CN108598383A English) (Year: 2018).*
Liu et al. CN109346335A English (Year: 2019).*

* cited by examiner

LITHIUM IRON PHOSPHATE COMPOSITE MATERIAL, PREPARATION METHOD AND USE

CROSS-REFERENCE TO RELATED APPLICATION

This application is a continuation of international PCT application serial no. PCT/CN2022/086015, filed on Apr. 11, 2022, which claims the priority to Chinese patent application No. 202111547010.3, entitled "Lithium iron phosphate composite material, preparation method and use", filed to China National Intellectual Property Administration on Dec. 16, 2021. The entireties of the above-mentioned patent applications are hereby incorporated by reference herein and made a part of this specification.

TECHNICAL FIELD

The present application belongs to the technical field of battery materials, and relates to a lithium iron phosphate composite material, a preparation method and uses.

BACKGROUND

With the innovation and development of technology, the requirements for the performance of lithium-ion batteries on the market are increasing continually, and high-rate lithium-ion batteries gradually attract people's interest. Electric equipment such as car models, aircraft models, ship models, etc. need to be supplied large currents continuously to meet high power requirements during work. Therefore, high-rate lithium-ion batteries are gradually selected as power sources in fields such as national defense and military industry, for example, electromagnetic interference, electromagnetic orbital launchers, magnetrons and other equipment. Lithium-ion batteries mainly contain three parts: positive electrode, electrolyte and negative electrode. In particular, lithium-ion battery positive electrode materials are the key factors that determine the battery's electrochemical performance, safety performance, energy density, and price and cost. Currently, there are many positive electrode materials for lithium-ion batteries, such as cobalt-based positive electrode materials, nickel-based positive electrode materials, manganese-based positive electrode materials, lithium iron phosphate positive electrode materials, etc.

In particular, the lithium iron phosphate ($LiFePO_4$) positive electrode material has a theoretical capacity of 170 mAh/g, a high reversible charge-discharge specific capacity, high energy density, stable voltage platform, long life, low cost, good safety performance, a wide range of raw material sources, low pollution, long cycle life and other advantages, it is currently an ideal positive electrode material for power and energy storage lithium-ion batteries, and is widely used in industries such as power vehicles and energy storage.

The crystal structure of lithium iron phosphate used in batteries is an olivine type structure. The atoms in the crystal are arranged in a hexagonal close-packed manner, but there is a slight distortion. It is an orthorhombic crystal system and the space group is Pnma. Due to the structure of the $LiFePO_4$ material, the electronic conductivity is low and the lithium ion diffusion coefficient is small, resulting in poor rate performance, which greatly limits the development in high-rate battery applications. At present, a large number of modification studies have been conducted on lithium iron phosphate at home and abroad to improve the conductive properties of lithium iron phosphate, mainly including preparation of nanoscale $LiFePO_4$, preparation of porous $LiFePO_4$, metal ion doping, etc. However, there is still great room for improvement of lithium iron phosphate prepared by the above method in terms of the electronic conductivity and ionic conductivity.

CN107240696A discloses a method for preparing carbon-coated lithium iron phosphate and carbon-coated lithium iron phosphate and a lithium-ion battery. The preparation method includes first mixing part of the carbon source with iron phosphate, grinding and drying, and then pre-sintering, mixing the pre-sintered material, lithium source and the other part of the carbon source, grinding and drying, and then sintering again to obtain the carbon-coated lithium iron phosphate. The carbon-coated lithium iron phosphate is prepared by two carbon source coatings and two sintering processes. The surface of the carbon-coated lithium iron phosphate prepared is coated by double carbon layers.

CN101580238A discloses a method for preparing a composite lithium iron phosphate material. The method includes formulating a lithium iron phosphate material and purified water into a suspension at a weight ratio of 1:5 to 15, slowly adjusting the pH of the suspension to 1 to 3 with phosphoric acid at a concentration of 5 to 30%, adding analytically pure soluble chloride in an amount of 0.05 to 2% of the moles of lithium iron phosphate material, then adding ammonia water to the solution, adjusting the pH value of the solution to 5 to 6 to generate a hydroxide colloid; spray-drying the liquid into powder, and calcining at 300-450° C. for 3-6 hours in an inert atmosphere; coating a high-conductivity oxide obtained by the thermal decomposition of the hydroxide colloid on the surface of the grains of the lithium iron phosphate material; ball milling and screening the calcined materials to obtain the finished products.

CN109301216A discloses a method for preparing a carbon-boron composite ball-coated lithium iron phosphate electrode. The method includes: step 1. mixing the carbon-boron composite ball and organic carbon-coated lithium iron phosphate precursor powder and then calcining to obtain a carbon-boron composite ball-coated lithium iron phosphate positive electrode material; step 2. adding a binder to the carbon-boron composite ball-coated lithium iron phosphate positive electrode material to obtain a carbon-boron composite ball-coated lithium iron phosphate positive electrode slurry; step 3. coating the carbon-boron composite ball-coated lithium iron phosphate positive electrode slurry on an aluminum foil base, and then drying and pressing in sequence to obtain a carbon-boron composite ball-coated lithium iron phosphate electrode.

Lithium iron phosphate batteries are currently the safest batteries. The phosphate groups in the unique olivine crystal structure of the lithium iron phosphate material have a stabilizing effect on the framework of the entire material, giving the material itself good thermal stability and cycle performance. However, the current issues are the poor conductivity and the slow diffusion rate of lithium ions in the lithium iron phosphate materials. This results in the actual specific capacity of lithium iron phosphate batteries being low when charging and discharging at high rates. This problem is a major difficulty restricting the development of the lithium iron phosphate battery industry.

SUMMARY

In view of the issues in the existing technology, an object of the present application is to provide a lithium iron phosphate composite material, a preparation method and use. The lithium iron phosphate composite material provided by the present application adopts $Li_6MnO_4$ as the positive electrode lithium supplement material, and solves problems of active lithium loss and capacity depletion under high-rate charge and discharge of lithium iron phosphate positive electrode, thereby improving the rate performance of the lithium iron phosphate materials and the cycle life of batteries at high rates.

To achieve this object, the present application adopts the following technical solutions:

In a first aspect, the present application provides a lithium iron phosphate composite material, in particular, the lithium iron phosphate composite material includes a core and a shell coated on the core, the core is $Li_6MnO_4$, and the shell is carbon-coated lithium iron phosphate.

The lithium iron phosphate composite material provided by the present application adopts $Li_6MnO_4$ as the positive electrode lithium supplement material, and solves problems of active lithium loss and capacity depletion under high-rate charge and discharge of lithium iron phosphate positive electrode, thereby improving the rate performance of the lithium iron phosphate materials and the cycle life of batteries at high rates. At the same time, adopting the carbon-coated lithium iron phosphate layer as the shell can form a complete conductive network on the surface of the lithium iron phosphate, significantly improving the conductivity of the carbon-coated lithium iron phosphate. Moreover, the carbon-coated lithium iron phosphate is quasi-spherical, which is beneficial to increasing the tap density of the carbon-coated lithium iron phosphate.

As a preferred embodiment of the present application, a mass ratio of the core to the shell is (0.005-0.05):1, for example, 0.005:1, 0.01:1, 0.015:1, 0.02:1, 0.025:1, 0.03:1, 0.035:1, 0.04:1, 0.045:1 or 0.05:1, but it is not limited to the numerals set forth, and other numerals that are not set forth within this numerical range are also applicable.

In a second aspect, the present application provides a preparation method for the lithium iron phosphate composite material described in the first aspect, the preparation method includes:

preparing a carbon-coated lithium iron phosphate precursor sol is prepared by adopting a sol-gel process, mixing a $Li_6MnO_4$ precursor and the carbon-coated lithium iron phosphate precursor sol under stirring until a solvent is completely evaporated to obtain a wet material, and calcining the wet material to obtain the lithium iron phosphate composite material.

As a preferred embodiment of the present application, a preparation process for the $Li_6MnO_4$ precursor includes:

weighing a manganese source and a first lithium source according to a stoichiometric ratio in $Li_6MnO_4$, respectively, mixing the manganese source and the first lithium source, ball milling and pre-calcining in sequence to obtain the $Li_6MnO_4$ precursor.

Preferably, the first lithium source includes any one or a combination of at least two selected from the group consisting of lithium hydroxide, lithium carbonate, lithium acetate, and lithium nitrate.

Preferably, the manganese source includes any one or a combination of at least two selected from the group consisting of manganese hydroxide, manganese acetate, and manganese monoxide.

As a preferred embodiment of the present application, the ball milling is performed at a rotation speed of 1000-3500 r/min, for example, 1000 r/min, 1200 r/min, 1400 r/min, 1600 r/min, 1800 r/min, 2000 r/min, 2200 r/min, 2400 r/min, 2600 r/min, 2800 r/min, 3000 r/min, 3200 r/min, 3400 r/min or 3500 r/min, but are not limited to the numerals set forth, and other numerals that are not set forth within this numerical range are also applicable.

Preferably, the ball milling is performed for a period of 0.5 to 2 h, for example, 0.5 h, 0.6 h, 0.7 h, 0.8 h, 0.9 h, 1.0 h, 1.1 h, 1.2 h, 1.3 h, 1.4 h, 1.5 h, 1.6 h, 1.7 h, 1.8 h, 1.9 h or 2.0 h, but are not limited to the numerals set forth, and other numerals that are not set forth within this numerical range are also applicable.

Preferably, the pre-calcining is performed at a temperature of 300-400° C., for example, 300° C., 310° C., 320° C., 330° C., 340° C., 350° C., 360° C., 370° C., 380° C., 390° C. or 400° C., However, it is not limited to the numerals set forth, and other numerals that are not set forth within this numerical range are also applicable.

Preferably, the pre-calcining is performed for a period of 1 to 3 h, for example, 1.0 h, 1.2 h, 1.4 h, 1.6 h, 1.8 h, 2.0 h, 2.2 h, 2.4 h, 2.6 h, 2.8 h or 3.0 h, but it is not limited to the numerals set forth, and other numerals that are not set forth within this numerical range are also applicable.

Preferably, the pre-calcining is performed in a nitrogen atmosphere or an argon atmosphere.

As a preferred embodiment of the present application, a preparation process for the carbon-coated lithium iron phosphate precursor sol includes:

mixing an iron source and a solvent, stirring and dispersing to obtain a dispersion solution, adding a carbon source, a chelating agent, a phosphorus source and a second lithium source under stirring, and warming for a period of time, to obtain the carbon-coated lithium iron phosphate precursor sol.

As a preferred embodiment of the present application, the iron source includes any one or a combination of at least two selected from the group consisting of ferric nitrate, ferrous sulfate and ferrous oxalate.

Preferably, the solvent includes deionized water.

Preferably, the carbon source includes any one or a combination of at least two selected from the group consisting of glucose, sucrose, and polyethylene glycol.

Preferably, the chelating agent includes polyethylene glycol and/or citric acid.

Preferably, the phosphorus source includes any one or a combination of at least two selected from the group consisting of lithium dihydrogen phosphate, ammonium dihydrogen phosphate, and diammonium hydrogen phosphate.

Preferably, the second lithium source includes any one or a combination of at least two selected from the group consisting of lithium hydroxide, lithium acetate, lithium nitrate, and lithium dihydrogen phosphate.

As a preferred embodiment of the present application, a molar ratio of Li element in the second lithium source, to Fe element in the iron source, to P element in the phosphorus source is (1.001-1.01):1:1, for example, 1.001:1:1, 1.002:1:1, 1.003:1:1, 1.004:1:1, 1.005:1:1, 1.006:1:1, 1.007:1:1, 1.008:1:1, 1.009:1:1 or 1.01:1:1, but it is not limited to the numerals set forth, and other numerals that are not set forth within this numerical range are also applicable.

Preferably, a mass ratio of a total of the second lithium source, the iron source and the phosphorus source to the carbon source is 1:(0.01-0.05), for example, 1:0.01, 1:0.015, 1:0.02, 1:0.025, 1:0.03, 1:0.035, 1:0.04, 1:0.045 or 1:0.05, but it is not limited to the numerals set forth, and other numerals that are not set forth within this numerical range are also applicable.

Preferably, a mass ratio of a total of the second lithium source, the iron source and the phosphorus source to the chelating agent is 1:(0.01~0.05), for example, 1:0.01, 1:0.015, 1:0.02, 1:0.025, 1:0.03, 1:0.035, 1:0.04, 1:0.045 or 1:0.05, but it is not limited to the numerals set forth, and other numerals that are not set forth within this numerical range are also applicable.

Preferably, a temperature for the warming is 50-70° C., for example, 50° C., 52° C., 54° C., 56° C., 58° C., 60° C., 62° C., 64° C., 66° C., 68° C. or 70° C., However, it is not limited to the numerals set forth, and other numerals that are not set forth within this numerical range are also applicable.

Preferably, the period of time for the warming is 5 to 10 h, for example, 5.0 h, 5.5 h, 6.0 h, 6.5 h, 7.0 h, 7.5 h, 8.0 h, 8.5 h, 9.0 h, 9.5 h or 10.0 h, but it is not limited to the numerals set forth, and other numerals that are not set forth within this numerical range are also applicable.

As a preferred embodiment of the present application, the mixing and stirring are performed at a temperature of 70-90° C., for example, 70° C., 72° C., 74° C., 76° C., 78° C., 80° C., 82° C., 84° C., 86° C., 88° C. or 90° C., but it is not limited to the numerals set forth, and other numerals that are not set forth within this numerical range are also applicable.

Preferably, the calcining is a gradient calcining.

Preferably, a process of the gradient calcining includes:

heating materials to a temperature of $T_1$ and maintaining the temperature of $T_1$ for a period of time $H_1$, and then heating materials to a temperature of $T_2$ and maintaining the temperature of $T_2$ for a period of time $H_2$.

Preferably, the $T_1$ is 350-390° C., for example, 350° C., 355° C., 360° C., 365° C., 370° C., 375° C., 380° C., 385° C. or 390° C., but it is not limited to the numerals set forth, and other numerals that are not set forth within this numerical range are also applicable.

Preferably, the $H_2$ is 12 to 25 min, for example, 12 min, 13 min, 14 min, 15 min, 16 min, 17 min, 18 min, 19 min, 20 min, 21 min, 22 min, 23 min, 24 min or 25 min, but is not limited to the numerals set forth, and other numerals that are not set forth within this numerical range are also applicable.

Preferably, the $T_2$ is 600-770° C., for example, 600° C., 610° C., 620° C., 630° C., 640° C., 650° C., 660° C., 670° C., 680° C., 690° C., 700° C., 710° C., 720° C., 730° C., 740° C., 750° C., 760° C. or 770° C., but it is not limited to the numerals set forth, and other numerals that are not set forth within this numerical range are also applicable.

Preferably, the $H_2$ is 0.5 to 5h, for example, 0.5 h, 1 h, 1.5 h, 2 h, 2.5 h, 3 h, 3.5 h, 4 h, 4.5 h or 5 h, but is not limited to the numerals set forth, and other numerals that are not set forth within this numerical range are also applicable.

Preferably, the calcining is performed in a nitrogen atmosphere or an argon atmosphere.

In a third aspect, the present application provides a lithium battery. The lithium battery includes a positive electrode, a diaphragm and a negative electrode stacked in sequence. The positive electrode includes a current collector and a positive electrode active layer disposed on the surface of the current collector of the positive electrode, the positive electrode active layer includes the lithium iron phosphate composite material described in the first aspect.

Compared with the prior art, the beneficial effects of the present application are:

the lithium iron phosphate composite material provided by the present application adopts $Li_6MnO_4$ as the positive electrode lithium supplement material, and solves problems of active lithium loss and capacity depletion under high-rate charge and discharge of lithium iron phosphate positive electrode, thereby improving the rate performance of the lithium iron phosphate materials and the cycle life of batteries at high rates. At the same time, adopting the carbon-coated lithium iron phosphate layer as the shell can form a complete conductive network on the surface of the lithium iron phosphate, significantly improving the conductivity of the carbon-coated lithium iron phosphate. Moreover, the carbon-coated lithium iron phosphate is quasi-spherical, which is beneficial to increasing the tap density of the carbon-coated lithium iron phosphate.

BRIEF DESCRIPTION OF DRA WINGS

DETAILED DESCRIPTION OF THE EMBODIMENTS

The technical solution of the present application will be further described below with reference to specific embodiments.

Example 1

This example provides a preparation method for a lithium iron phosphate composite material. The preparation method includes:

(1) Preparation of $Li_6MnO_4$ precursor: lithium hydroxide and manganese monoxide with molar ratio Li:Mn=6:1 were weighed, mixed and then ball-milled with a high-speed ball mill at 3500 r/min for 0.5 h, pre-sintered at 400° C. for 1 h to obtain the $Li_6MnO_4$ precursor, ready for use;

(2) Preparation of carbon-coated lithium iron phosphate precursor sol: ferrous oxalate was added to deionized water and stirred for dispersion to obtain a dispersion. Under stirring conditions, sucrose, polyethylene glycol, ammonium dihydrogen phosphate and lithium hydroxide were added in sequence, and the dispersion was kept at a temperature of 70° C. for 5 h to obtain a carbon-coated lithium iron phosphate precursor sol, in which the molar ratio of Li:Fe:P in lithium hydroxide, iron nitrate and ammonium dihydrogen phosphate was 1.01:1:1, the mass ratio of the total mass of lithium hydroxide, iron nitrate and ammonium dihydrogen phosphate to glucose is 1:0.05, and the mass ratio of the total mass of lithium hydroxide, iron nitrate and ammonium dihydrogen phosphate to polyethylene glycol is 1:0.05; and (3) Preparation of lithium iron phosphate composite material: the $Li_6MnO_4$ precursor prepared in step (1) was added to the carbon-coated lithium iron phosphate precursor sol prepared in step (2), and the solution was kept at a temperature of 90° C., and the stirring was continued until the solvent was sufficiently evaporated to obtain a wet material; a gradient calcination was performed on the wet material: the wet material was heated to 390° C. in a high-purity nitrogen atmosphere, and kept the temperature for 12 minutes; then heated to 770° C., and kept the temperature for 0.5h, to obtain the lithium iron phosphate composite material.

Figure 1:
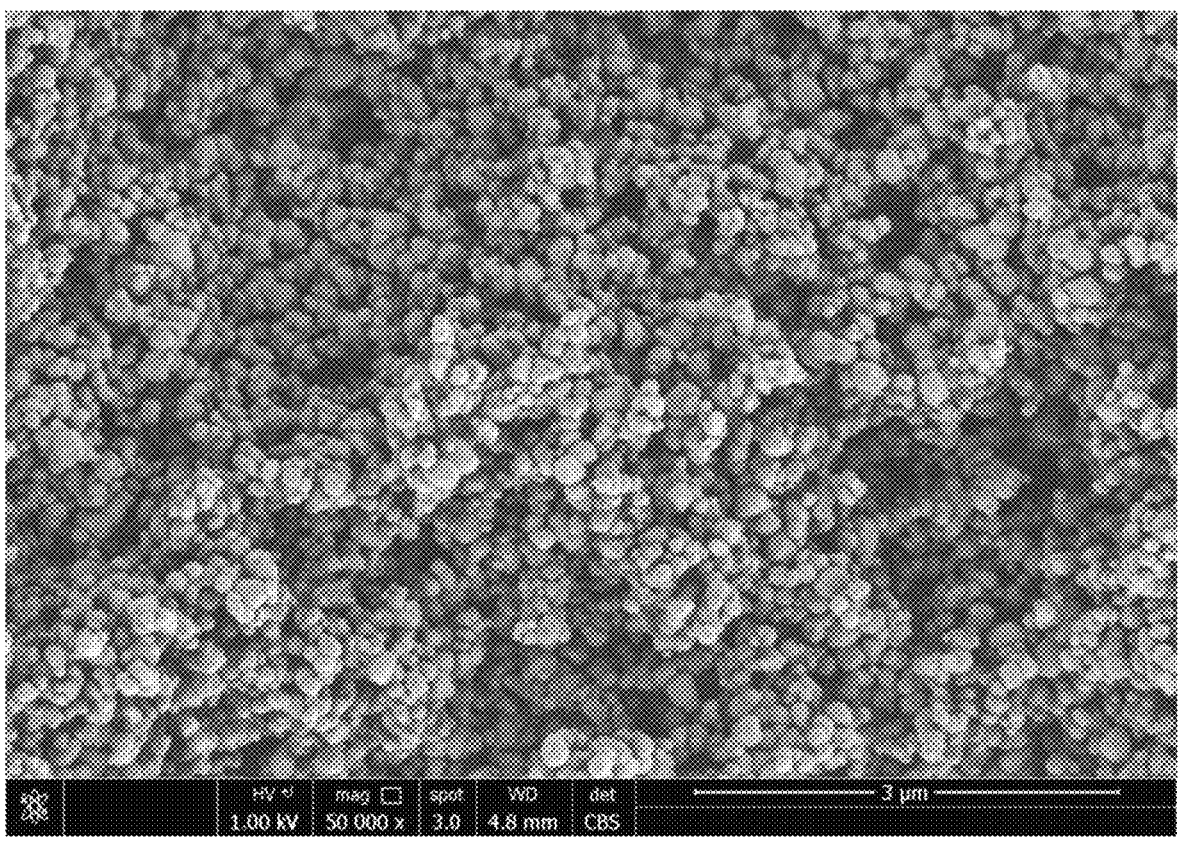
FIG. 1 is an SEM image of the lithium iron phosphate composite material prepared in Example 1.
Figure 2:
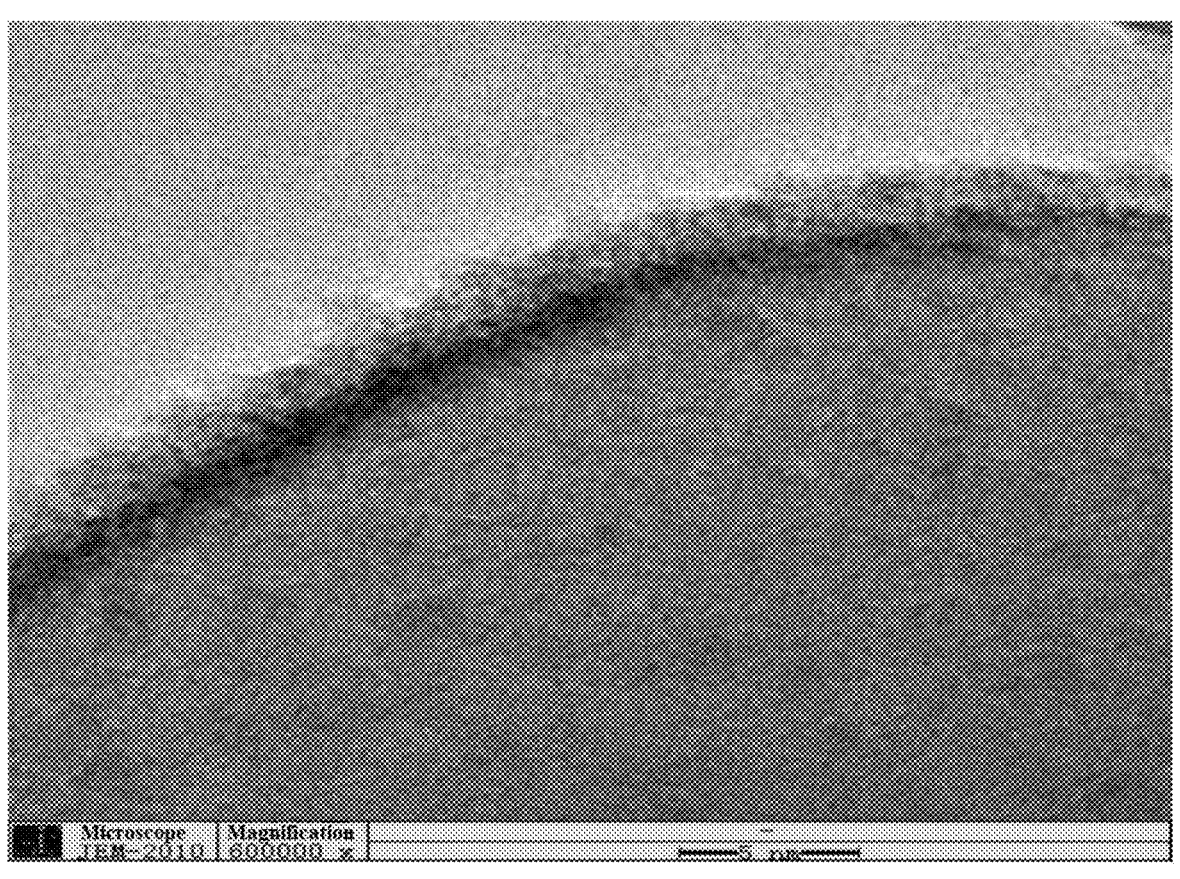
FIG. 2 is a TEM image of the lithium iron phosphate composite material prepared in Example 1.

The lithium iron phosphate composite material has a $Li_6MnO_4$ core and a carbon-coated lithium iron phosphate outer coating. The mass ratio of $Li_6MnO_4$ to carbon-coated lithium iron phosphate is 0.05:1. In particular, FIG. 1 is an SEM image of the prepared lithium iron phosphate composite material. It can be seen from FIG. 1 that the particle size of the composite material is relatively uniform, and the particle size is basically within 1 μm. FIG. 2 is a TEM image of the prepared lithium iron phosphate composite material. It can be seen from FIG. 2 that the thickness of the outer coating of carbon-coated lithium iron phosphate is about 1.5 to 2 nm, and the coating layer is relatively uniform.

The physical and chemical indicators of the prepared lithium iron phosphate composite material were tested by conventional technical means. The results are shown in Table 1 below:

TABLE 1

| Indicators | D10 | D50 | D90 | Dmax | Carbon content |
|---|---|---|---|---|---|
| Numeral | 0.13 μm | 0.25 μm | 0.42 μm | 0.59 μm | 1.52% |
| pH | SSA | TD | Compaction density of the powder | Size of the grain | Lattice volume |
| 9.25 | 13.95 $m^2/g$ | 0.83 $g/cm^3$ | 2.39 g/cc | 102.7 nm | 290.65 $Å^{-3}$ |

Example 2

This example provides a preparation method for a lithium iron phosphate composite material. The preparation method includes:

(1) Preparation of $Li_6MnO_4$ precursor: lithium hydroxide and manganese hydroxide with molar ratio Li:Mn=6:1 were weighed, mixed and then ball-milled with a high-speed ball mill at 1000 r/min for 2 h, pre-sintered at 300° C. for 3 h to obtain the $Li_6MnO_4$ precursor, ready for use;

(2) Preparation of carbon-coated lithium iron phosphate precursor sol: iron nitrate was added to deionized water and stirred for dispersion to obtain a dispersion. Under stirring conditions, sucrose, polyethylene glycol, ammonium dihydrogen phosphate and lithium dihydrogen phosphate were added in sequence, and the dispersion was kept at a temperature of 50° C. for 10 hours to obtain a carbon-coated lithium iron phosphate precursor sol, in which the molar ratio of Li:Fe:P in lithium dihydrogen phosphate, iron nitrate and ammonium dihydrogen phosphate was 1.001:1:1, the mass ratio of the total mass of lithium dihydrogen phosphate, iron nitrate and ammonium dihydrogen phosphate to glucose is 1:0.01, and the mass ratio of the total mass of lithium dihydrogen phosphate, iron nitrate, and ammonium dihydrogen phosphate to polyethylene glycol is 1:0.01;

(3) Preparation of lithium iron phosphate composite material: the $Li_6MnO_4$ precursor prepared in step (1) was added to the carbon-coated lithium iron phosphate precursor sol prepared in step (2), and the solution was kept at a temperature of 70° C., and the stirring was continued until the solvent was sufficiently evaporated to obtain a wet material; a gradient calcination was performed on the wet material: the wet material was heated to 350° C. in a high-purity nitrogen atmosphere, and kept the temperature for 25 minutes; then heated to 600° C., and kept the temperature for 5h, to obtain the lithium iron phosphate composite material.

The lithium iron phosphate composite material has a $Li_6MnO_4$ core and a carbon-coated lithium iron phosphate outer coating. The mass ratio of $Li_6MnO_4$ to carbon-coated lithium iron phosphate is 0.005:1.

Example 3

This example provides a preparation method for a lithium iron phosphate composite material. The preparation method includes:

(1) Preparation of $Li_6MnO_4$ precursor: lithium hydroxide and manganese monoxide with molar ratio Li:Mn=6:1 were weighed, mixed and then ball-milled with a high-speed ball mill at 2400 r/min for 1 h, pre-sintered at 360° C. for 2 h to obtain the $Li_6MnO_4$ precursor, ready for use;

(2) Preparation of carbon-coated lithium iron phosphate precursor sol: ferrous oxalate was added to deionized water and stirred for dispersion to obtain a dispersion. Under stirring conditions, sucrose, citric acid, ammonium dihydrogen phosphate and lithium nitrate were added in sequence, and the dispersion was kept at a temperature of 60° C. for 7 hours to obtain a carbon-coated lithium iron phosphate precursor sol, in which the molar ratio of Li:Fe:P in lithium nitrate, ferrous oxalate and ammonium dihydrogen phosphate is 1.005:1:1, the mass ratio of the total mass of ammonium dihydrogen phosphate, ferrous oxalate and ammonium dihydrogen phosphate to sucrose is 1:0.02, and the mass ratio of the total mass of ammonium dihydrogen phosphate, ferrous oxalate and ammonium dihydrogen phosphate to polyethylene glycol is 1:0.03;

(3) Preparation of lithium iron phosphate composite material: the $Li_6MnO_4$ precursor prepared in step (1) was added to the carbon-coated lithium iron phosphate precursor sol prepared in step (2), and the solution was kept at a temperature of 80° C., and the stirring was continued until the solvent was sufficiently evaporated to obtain a wet material; a gradient calcination was performed on the wet material: the wet material was heated to 370° C. in a high-purity nitrogen atmosphere, and kept the temperature for 20 minutes; then heated to 700° C., and kept the temperature for 2h, to obtain the lithium iron phosphate composite material.

The lithium iron phosphate composite material has a $Li_6MnO_4$ core and a carbon-coated lithium iron phosphate outer coating. The mass ratio of $Li_6MnO_4$ to carbon-coated lithium iron phosphate is 0.01:1.

Comparative Example

This comparative example provides a preparation method for a lithium iron phosphate composite material. The preparation method includes:

(1) Preparation of carbon-coated lithium iron phosphate precursor sol: ferrous oxalate was added to deionized water and stirred for dispersion to obtain a dispersion. Under stirring conditions, sucrose, polyethylene glycol, ammonium dihydrogen phosphate and lithium hydroxide were added in sequence, and the dispersion was kept at a temperature of 50° C. for 5 h to obtain a carbon-coated lithium iron phosphate precursor sol, in which the molar ratio of Li:Fe:P in lithium hydroxide, iron nitrate and ammonium dihydrogen phosphate was 1.001:1:1, the mass ratio of the total mass of lithium hydroxide, iron nitrate and ammonium dihydrogen phosphate to glucose is 0.01:1, and the mass ratio of the total mass of lithium hydroxide, iron nitrate and ammonium dihydrogen phosphate to polyethylene glycol is 0.01:1; and (2) the carbon-coated lithium iron phosphate precursor prepared in step (1) was stirred continuously at 70° C. until the solvent was sufficiently evaporated to obtain a wet material; a gradient calcination was performed on the wet material: the wet material was heated to 350° C. in a high-purity nitrogen atmosphere, and kept the temperature for 12 minutes; then heated to 600° C., and kept the temperature for 0.5h, to obtain the carbon-coated lithium iron phosphate material.

Figure 3:
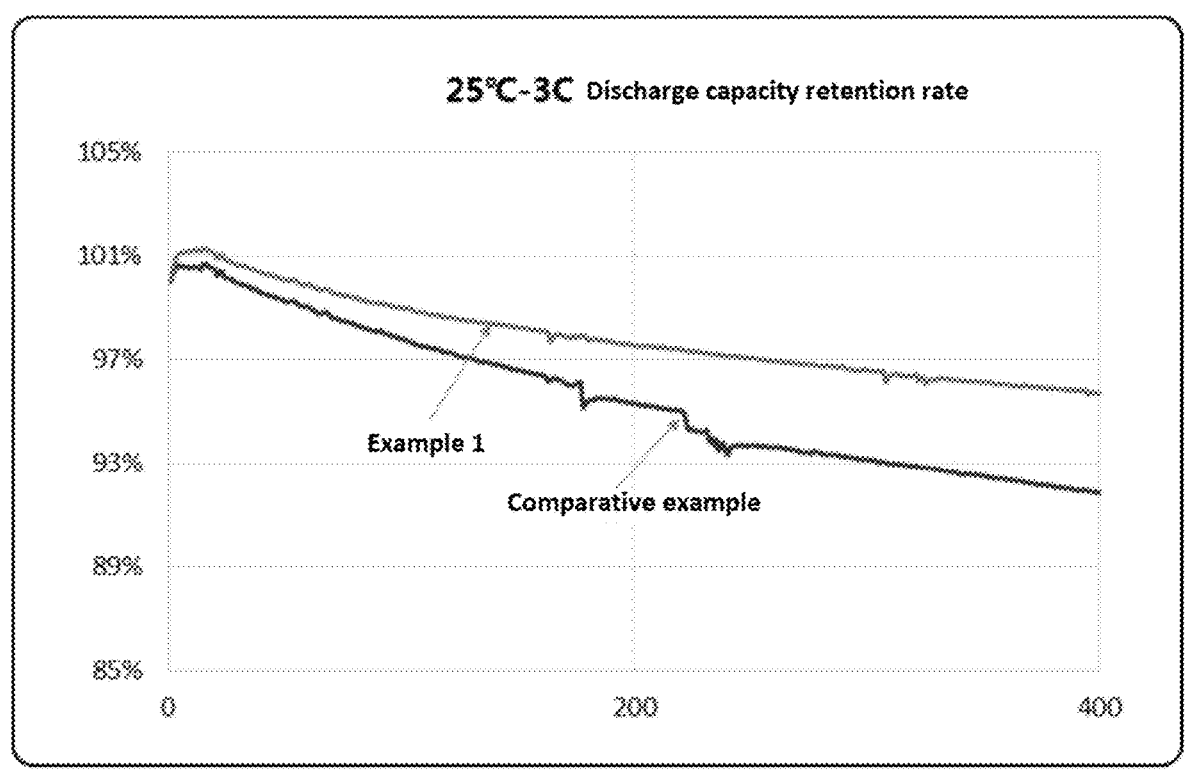
FIG. 3 is a graph showing the discharge capacity retention rate of Example 1 and Comparative example under 25° C. and 3C rate condition.
Figure 4:
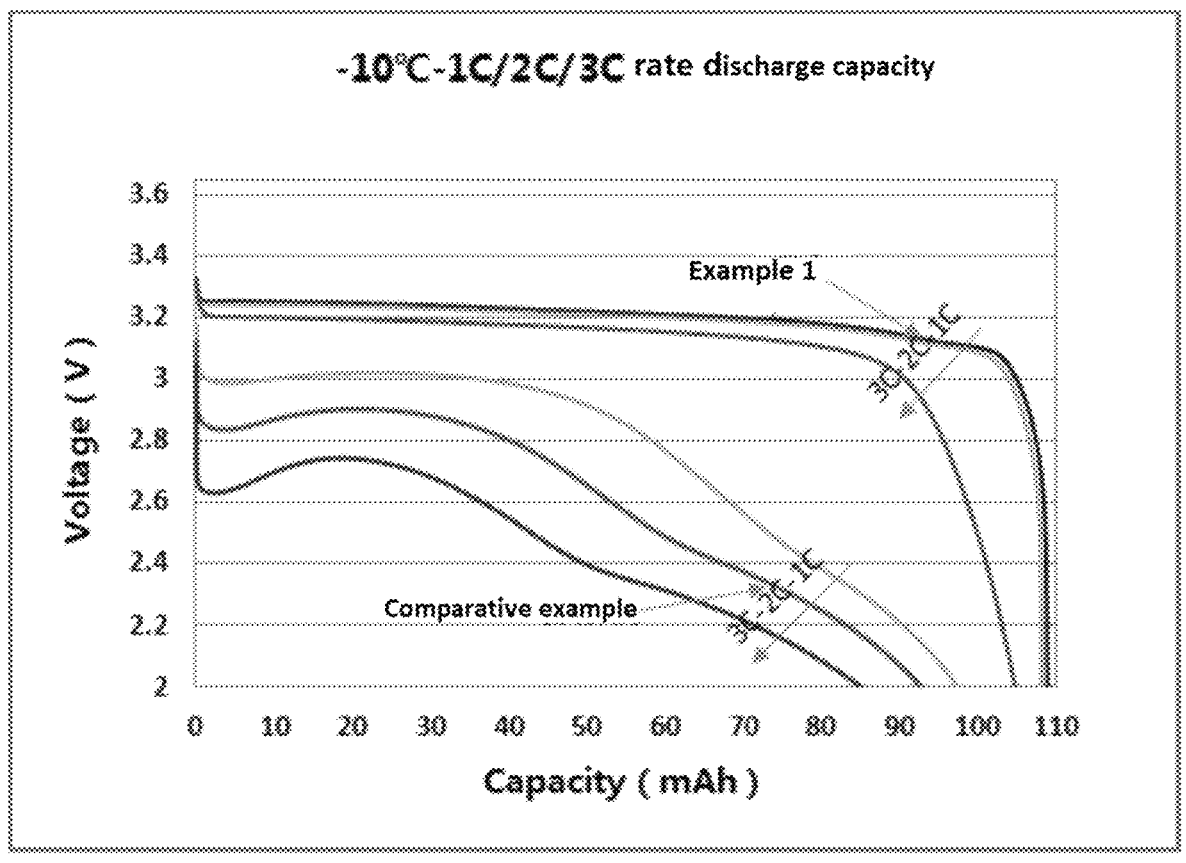
FIG. 4 is a discharge capacity diagram of Example 1 and Comparative example at –10° C. and different rate conditions.

The lithium iron phosphate materials prepared in Examples 1-3 and Comparative example were tested for electrochemical performance in lithium ion batteries. The results are shown in Table 2. FIG. 3 is a comparison graph showing the discharge capacity retention rate of Example 1 and Comparative example under 25° C. and 3C rate condition. FIG. 4 is a comparison discharge capacity diagram of Example 1 and Comparative example at −10° C. and different rate conditions.

TABLE 2

| Examples | Discharge capacity retention rate for 400 cycles under 25° C. and 3 C (%) | Discharge capacity at −10° C. 1 C (mAh) | Discharge capacity at −10° C. 2 C (mAh) | Discharge capacity at −10° C. 3 C (mAh) |
|---|---|---|---|---|
| Example 1 | 95.71 | 108.16 | 107.75 | 104.65 |
| Example 2 | 95.9 | 106.14 | 105.93 | 102.18 |
| Example 3 | 95.3 | 108.02 | 106.95 | 103.97 |
| Comparative example | 91.82 | 97.36 | 92.97 | 85.05 |

It can be seen from the data in Table 1 that the capacity retention rate and discharge capacity at different discharge rates of the carbon-coated lithium iron phosphate positive electrode material prepared in Comparative example are smaller than those in the Examples.

As can be seen from FIG. 3, under 3C (25° C. 2.0-3.65V) condition, as to the battery performance in Example 1, the discharge capacity retention rate for 400 cycles is 95.71%. However, as to the battery performance in the lithium iron phosphate material of the Comparative example, the discharge capacity retention rate for 400 cycles is only 91.82%. As can be seen from FIG. 4, under −10° C. (1C/2C/3C 2.0-3.65V) condition, as to the battery performance in Example 1, the discharge capacity at 1C is 108.16 mAh, the discharge capacity at 2C is 107.75 mAh, and the discharge capacity at 3C is 104.65 mAh. However, as to the battery performance in the lithium iron phosphate material of the Comparative example, the discharge capacity at 1C is 97.36 mAh, the discharge capacity at 2C is 92.97 mAh, and the discharge capacity at 3C is 85.05 mAh, indicating that the lithium iron phosphate composite material prepared in Example 1 has good rate performance and cycle performance.

In summary, in the preparation method of the present application, nanoscale lithium iron phosphate precursor is prepared by the sol-gel method, nanoscale lithium iron phosphate is evenly coated on $Li_6MnO_4$ as the shell. Adopting $Li_6MnO_4$ as the positive electrode lithium supplement material to solve problems of active lithium loss and capacity depletion under high-rate charge and discharge of lithium iron phosphate positive electrode, thereby improving the rate performance of the lithium iron phosphate materials and the cycle life of batteries at high rates. Moreover, by adopting the preparation method of the present application, the temperature and period required for sintering of lithium iron phosphate materials can be effectively reduced, which decreases the production energy consumption and production cycle.

It is declared by the applicant that the above are only specific embodiments of the present application, the protection scope of the present application is not limited thereto. Those skilled in the art should understand that any changes or substitutions that easily occurs to any person skilled in the art in the technical scope of the present application fall within the protection scope and disclosure scope of the present application.

What is claimed is:

1. A preparation method for a lithium iron phosphate composite material, wherein the lithium iron phosphate composite material comprises a core and a shell coated on the core, the core is $Li_6MnO_4$, and the shell is carbon-coated lithium iron phosphate;

the preparation method for the lithium iron phosphate composite material comprises:

preparing a carbon-coated lithium iron phosphate precursor sol by adopting a sol-gel process, mixing a $Li_6MnO_4$ precursor and the carbon-coated lithium iron phosphate precursor sol under stirring until a solvent is completely evaporated to obtain a wet material, and calcining the wet material to obtain the lithium iron phosphate composite material, wherein a mass ratio of the core to the shell is (0.005-0.05):1, wherein a preparation process for the $Li_6MnO_4$ precursor comprises:

weighing a manganese source and a first lithium source according to a stoichiometric ratio in $Li_6MnO_4$, respectively, mixing the manganese source and the first lithium source, ball milling, and pre-calcining at a temperature of 300-400° C. for a period of 1 to 3 hours in a nitrogen atmosphere or an argon atmosphere, in sequence, to obtain the $Li_6MnO_4$ precursor.

2. The preparation method according to claim 1, wherein the first lithium source comprises any one or a combination of at least two selected from the group consisting of lithium hydroxide, lithium carbonate, lithium acetate, and lithium nitrate.

3. The preparation method according to claim 1, wherein the manganese source comprises any one or a combination of at least two selected from the group consisting of manganese hydroxide, manganese acetate, and manganese monoxide.

4. The preparation method according to claim 1, wherein the ball milling is performed at a rotation speed of 1000-3500 r/min, and the ball milling is performed for a period of 0.5 to 2 hours.

5. The preparation method according to claim 1, wherein a preparation process for the carbon-coated lithium iron phosphate precursor sol comprises:

mixing an iron source and a solvent, stirring and dispersing to obtain a dispersion solution, adding a carbon source, a chelating agent, a phosphorus source and a second lithium source under stirring, and warming for a period of time, to obtain the carbon-coated lithium iron phosphate precursor sol.

6. The preparation method according to claim 5, wherein the iron source comprises any one or a combination of at least two selected from the group consisting of ferric nitrate, ferrous sulfate and ferrous oxalate.

7. The preparation method according to claim 5, wherein the solvent comprises deionized water.

8. The preparation method according to claim 5, wherein the carbon source comprises any one or a combination of at least two selected from the group consisting of glucose, sucrose, and polyethylene glycol.

9. The preparation method according to claim 5, wherein the phosphorus source comprises any one or a combination of at least two selected from the group consisting of lithium dihydrogen phosphate, ammonium dihydrogen phosphate, and diammonium hydrogen phosphate.

10. The preparation method according to claim 5, wherein the second lithium source comprises any one or a combination of at least two selected from the group consisting of lithium hydroxide, lithium acetate, lithium nitrate, and lithium dihydrogen phosphate.

11. The preparation method according to claim 5, wherein a molar ratio of Li element in the second lithium source, to Fe element in the iron source, to P element in the phosphorus source is $(1.001\text{-}1.01)\text{:}1\text{:}1$.

12. The preparation method according to claim 5, wherein a mass ratio of a total of the second lithium source, the iron source and the phosphorus source to the carbon source is $1\text{:}(0.01\text{-}0.05)$.

13. The preparation method according to claim 5, wherein a mass ratio of a total of the second lithium source, the iron source and the phosphorus source to the chelating agent is $1\text{:}(0.01\text{-}0.05)$.

14. The preparation method according to claim 5, wherein a temperature for the warming is 50-70° C., and the period of time for the warming is 5 to 10 hours.

15. The preparation method according to claim 1, wherein the mixing and stirring are performed at a temperature of 70-90° C.

16. The preparation method according to claim 1, wherein the calcining is a gradient calcining, a process of the gradient calcining comprises:

heating materials to a temperature of $T_1$ and maintaining the temperature of $T_1$ for a period of time $H_1$, and then heating materials to a temperature of $T_2$ and maintaining the temperature of $T_2$ for a period of time $H_2$, wherein the $T_1$ is 350-390° C., the $H_1$ is 12 to 25 minutes, the $T_2$ is 600-770° C., and the $H_2$ is 0.5-5h.

* * * * *